Patented Feb. 1, 1944

2,340,763

UNITED STATES PATENT OFFICE 2,340,763

PHOTOGRAPHIC COMPOSITION AND PROCESS

David M. McQueen, Wilmington, Del., assignor, by mesne assignments, to E. I. du Pont de Nemours & Company, Wilmington, Del., a corporation of Delaware No Drawing. Application April 17, 1941, Serial No. 389,073

15 Claims. (Cl. 95—6)

This invention pertains to new and useful dye intermediates and to their preparation and use in photographic color processes. More particularly it pertains to symmetrical methinyl disulfides and to their preparation and use in processes of color photography and elements therefor. The invention also pertains to novel color yielding elements and colloid compositions and their preparation and use and to novel dye coupling procedures.

An object of this invention is to provide a new class of dye intermediates, more particularly dye intermediates which are immobile in water-permeable organic colloid media or binding agents. Another object is to provide such immobile dye intermediates which will form quinoneimine or azomethine dyes on color coupling. A further object is to provide dye intermediates containing disulfide linkages which will couple under conditions of photographic development with color coupling developing agents. Other objects include the provision of practical immobile dye intermediates for color yielding layers of elements useful in color photography from commercially available compounds. Still other objects will be apparent from the hereinafter described invention.

It has been discovered that compounds which contain active methylene groups and which are capable of coupling to produce dyes during development or reduction of silver salts with color coupling agents can be made into especially desirable dye intermediates for photographic color processes by joining two molecules through a disulfide bridge of atoms. Compounds containing active methylene groups which diffuse in colloid layers can thus be made into immobile dye intermediates which have utility in many photographic color processes and elements therefor. The compounds of this invention which may be so produced are methinyl disulfides having attached to each methinyl carbon atom a carbonyl group and an unsaturated activating group. By "unsaturated activating group" is meant a carbon atom joined to another atom by a multiple bond, e. g. a carbon atom multiply bonded to an atom of another element such as oxygen or nitrogen or to another carbon atom. Suitable activating groups include carbonyl, ester, amide, imino, cyano and vinyl groups. The carbonyl, methinyl and activating groups may form part of a ring system in which case the activating groups may also be sulfur, oxygen or nitrogen connected to a multiply bonded carbon atom.

One embodiment of the invention may be exemplified in terms of the preparation of compounds containing a disulfide (—S—S—) bridging linkage from acylacetamides of the general formula:

(1) 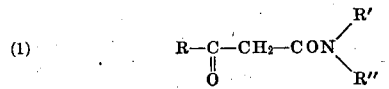

wherein RCO— is the acyl radical of an organic acid, R' and R'' are the same or different and represent hydrogen, hydrocarbon or substituted hydrocarbon radicals.

The products of this invention obtained by the introduction of a disulfide linkage as above described in acylacetamides have the general formula:

(2) 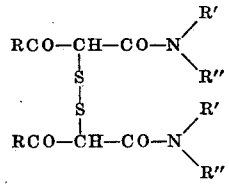

wherein R, R' and R'' have the same significance as in Formula 1. It will be noted that the compounds of Formula 1 when converted to Formula 2 have their molecular weight more than doubled.

A similar class of useful compounds can be made by substituting for the RCO radical in Formula 1 a cyano (NC—) radical, which will result in dye intermediates of the type set forth in Formula 2 except the RCO groups are replaced by cyano groups.

In the case of compounds having intracyclic active methylene groups as exemplified by the pyrazolones the resulting disulfides have the general formula:

(3) 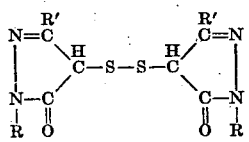

wherein R and R'' are the same or different and may be hydrogen or hydrocarbon radicals.

The methinyl disulfides having attached to each methinyl carbon atom a carbonyl group and an unsaturated activating group in general may be prepared by reacting a compound containing an active methylene group as aforedescribed with the sulfur chloride in the liquid phase until the condensation is substantially completed while maintaining the reaction at temperatures below the boiling point of sulfur chloride at the pressure used which is preferably about atmospheric.

The organic compounds are preferably dissolved in an inert solvent such as chloroform, and admixed with sulfur chloride which may be further diluted with an inert organic solvent. The temperature is maintained below the boiling point of the mixture and the reaction is allowed to proceed until the condensation is substantially completed. This can be determined by (1) the cessation of evolution of hydrogen chloride or (2) when further addition of sulfur chloride to the reaction mixture brings no further precipitation. In the procedures just mentioned substantially theoretical equivalents of the reactants are preferably used.

An alternative method of preparation can be employed when the starting material is insoluble in organic solvents. In this case the active methylene compound is dissolved in dilute aqueous alkali and maintained at 0° C. to 10° C. while adding sulfur chloride, preferably diluted with an inert, water-miscible organic solvent such as dioxane.

Other methods of preparation may be used which are quite similar to the above, including the reaction of the corresponding methinyl halides with sodium, potassium or ammonium disulfide.

It has been further discovered that the new dye intermediates or color former structures hereof are of great utility in leading to the synthesis of high molecular weight dye intermediates or color formers which are completely immobile or nondiffusing in cold water-insoluble, water-permeable colloid layers. According to this important aspect of the invention the high molecular weight products are in general of two types:

(a) Compounds containing the disulfide (—S—S—) bridging radical and at least one long chain aliphatic group of at least 8 carbon atoms; and (b) Polymeric compounds containing disulfide (—S—S—) bridging radicals. The polymeric compounds are preferred.

The compounds of type a may vary considerably in structure. Thus, the long chain aliphatic group may form part of R, R' or R'' in Formulae 1, 2 and 3.

The polymeric compounds of type b may be prepared by reacting with sulfur chloride a color former or dye intermediate containing at least two groups which will react with sulfur chloride, at least one of which is an active methylene group. The compounds are dissolved or dispersed in an aqueous alkaline medium and admixed with a solution of sulfur chloride in an inert water miscible solvent and the reaction allowed to proceed while maintaining a low temperature, e. g. 0° to 10° C. until condensation is completed. An amorphous or resinous material usually separates upon completion of the condensation and this polymer can be isolated and purified by any suitable method.

The novel dye intermediates or color formers hereof which contain disulfide (—S—S—) linkages are non-migratory, can be incorporated in colloid binding agent coating compositions in the known manners. Thus, they may be dispersed in the binding agent while in a finely divided state using dispersing agents, if desired. The coating solutions may then be deposited on a film base or support which has been suitably subbed or on another colloid layer which may be a light sensitive layer or colloid layer containing another immobile dyestuff intermediate of the same or different type. When the dye intermediates are to be used in light sensitive layers such as gelatino-silver halide emulsion layers, they are incorporated in the photographic emulsions which are coated in the known manners.

The above-described classes of color formers may be incorporated in a photographic emulsion or may be added to a developer solution in the known manners. In the event that their solubility is insufficient for the purpose they may be finely divided and dispersed with the aid of dispersing agents, e. g. higher alkyl sulfates and sulfonates, alkylated aromatic sulfonates, etc., if necessary. They may also be used in conjunction with the usual cyanine, carbocyanine, pseudocyanine, cyazine, carbocyazine salts and bases which are used to extend the sensitivity of silver halide emulsions.

Silver halide emulsions containing the above color formers may be worked up in the usual manner. One or more emulsion layers may be superposed on one or both sides of transparent supports as desired. The layers may be used for color photography and for such purposes the layers are sensitized respectively for different regions of the spectrum. Several color formers may be introduced into a single layer, being so selected that by development they give complementary colors.

The development process used in carrying out this invention may be applied to a latent image in an emulsion of a silver halide which has been exposed to light and which may or may not contain the novel color formers hereof, the exposures having been made in a camera or by printing through a photographic negative image. Or it may be applied to the residual unaltered silver salt left where an initial reduced silver image has been dissolved away as in a reversal process of development. Or it may be applied to a developed photographic image in metallic silver which has been fixed by the removal of unaltered silver halides by means of solvents and subsequently converted to a developable silver salt by means of known photographic bleaching agents.

The invention will be further illustrated but is not intended to be limited by the following examples.

*Example I*

Two and one-half parts of dithio-bis-acetoacetanilide of probable formula:

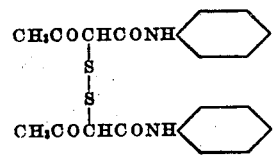

is dissolved in a small amount of alcohol and added to the photographic developer composition hereindescribed below:

| | Parts |
|---|---|
| p-Aminodiethylaniline hydrochloride | 2 |
| Sodium carbonate | 20 |
| Sodium sulfite | 1 |
| Water | 985 | to which is added if necessary a small amount of 20% sodium hydroxide. Development of a silver halide image with this composition yields a yellow-brown picture. The dithio-bis-acetoacetanilide was prepared by adding 13.5 parts sulfur monochloride to a solution of 36 parts acetoacetanilide in 300 parts chloroform while maintaining the temperature at 15–20° C. After all is added, the mixture is heated on the steam bath until the volume is reduced to one-half. Upon cooling, a white solid precipitates which, after recrystallization from ethyl acetate, melts at 150–153° C. and upon analysis is found to contain 15.55% sulfur, while the amount calculated from the probable formula given above is 15.46% sulfur.

One gram dithio-bis-acetoacetanilide is incorporated in 80 parts gelatino-silver halide photographic emulsion and coated on a suitably subbed cellulose acetate film. The resulting film is exposed and developed with p-aminodiethylaniline developer. A yellow picture is obtained.

Example II

Two parts of the compound obtained by treating 3-hydroxythionaphthene of formula:

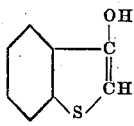

with sulfur monochloride in a manner similar to that of Example I is incorporated in a developer prepared by dissolving 2 parts p-aminodimethylaniline hydrochloride in 480 parts water and stirring the resulting solution into a solution of 20 parts sodium carbonate and 1 part sodium sulfite in 500 parts water. To the resulting composition is added 5 parts 20% sodium hydroxide solution. This color developer is used to develop a photographic element containing a positive silver salt image and a bright magenta dye image is obtained in situ with the reduced silver image. The silver and silver salts can be removed in known manners, leaving a dye image.

Example III

Nineteen parts 1-m-aminophenyl-3-methyl-5-pyrazolone is dissolved in a solution of 25 parts sodium carbonate monohydrate in 150 parts water, and the resulting solution is cooled to 15° C. With constant stirring, 14 parts sulfur monochloride is added dropwise. A resinous product namely dithio-bis-1-m-aminophenyl-3-methyl-5-pyrazolone, separates out during this addition and it is filtered off, washed with water, and finally dissolved in dilute sodium hydroxide solution. After filtering, the product is reprecipitated with dilute acetic acid and washed with water.

Two parts of the resinous product is dissolved in a small amount of water containing dilute sodium hydroxide and alcohol and the solution is incorporated in 100 parts of a photographic gelatino-silver bromide emulsion. After coating on cellulose acetate film, the emulsion is exposed in a camera and developed with a p-amino diethylaniline color developer. After treatment with Farmer's reducer, a magenta picture is obtained.

Example IV

Ten parts s-bis [m-(3-methyl-5-pyrazolone-1-yl) phenyl] urea is dissolved in a solution of 40 parts 20% sodium hydroxide in 300 parts water containing a trace of sodium dodecyl sulfate. This solution is chilled in an ice-water bath and 3.5 parts sulfur monochloride dissolved in 15 parts dioxane is dropped in slowly. A solid separates which is filtered off and washed with water. The white product is dissolved in dilute sodium hydroxide solution, filtered, and dialyzed for five days in a cellulose membrane. Removal of the solution and precipitation of the product with dilute acetic acid followed by washing and drying, yielded a white solid resinous material. This polymer had the following probable structure:

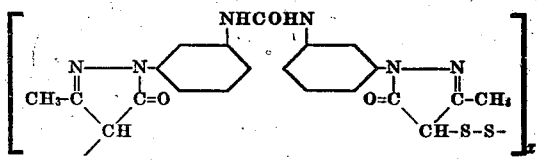

Two grams of this solid were dissolved in 100 parts photographic emulsion and coated on a cellulose nitrate film. After exposure and development with p-aminodimethylaniline color developer, a magenta picture was obtained.

Example V

Three parts of the polymeric compound obtained by treating p-phenylene-bis-acetoacetamide of the following formula,

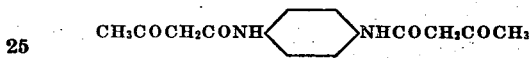

with sulfur monochloride in a manner similar to Example I, is dissolved in a small amount of dilute sodium hydroxide solution and ethanol and added to 100 parts photographic emulsion. This is coated on a cellulose nitrate film, dried, and the blue separation negative of a three-color picture is printed upon it. Development with p-aminodiethylaniline developer followed by treatment of the film with potassium ferricyanide solution and treatment with hypo shows that the separation has been printed in a yellow color.

Example VI

Two parts of the resinous product obtained by treating 1,1'-p-phenylene-bis-3-methyl-5-pyrazolone of the following formula:

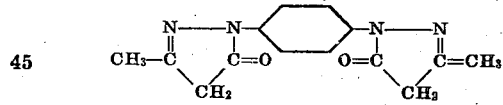

with sulfur monochloride in a manner similar to that of Example IV is dissolved in a small amount of water containing sodium hydroxide and a small proportion of ethanol. The solution is added to 100 parts photographic silver bromide-gelatin emulsion and coated on a cellulose nitrate film. The green separation negative of a color picture is printed upon this film. After color development with p-aminodiethylaniline, treatment with potassium ferricyanide, and fixing, the film is seen to contain a magenta picture.

Example VII

Two parts dithio-bis-1-phenyl-3-methyl-5-pyrazolone of probable formula:

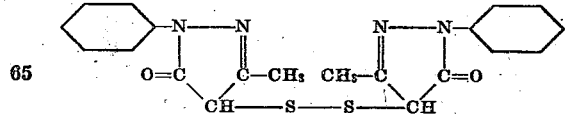

is dissolved in the following solution:

| | Parts |
|---|---|
| p-Aminodiethylaniline hydrochloride | 2 |
| Sodium carbonate | 20 |
| Sodium sulfite | 1 |
| Water | 985 | to which is added if necessary a small amount of 20% sodium hydroxide to dissolve the pyrazolone derivative completely. The pyrazolone derivative may be prepared by the method of Sprague and Höltzcke, J. Chem. Soc. 59, 338-9 (1891). The resulting solution is used to develop a positive silver ferrocyanide image and a magenta picture is obtained after bleaching and removing silver and silver salts.

In place of the specific compounds described in Examples I, II, III, IV, V and VI for condensation with sulfur chloride may be substituted various other color coupling compounds which contain active methylene groups. Additional compounds include p-(n-octyl)-acetoacetanilide, 3-hydroxy-coumarone, ethylmalonate, ethyl N-phenylmalonamate, ethyl N-(p-nitrophenyl)-malonamate, ethyl cyanoacetate, cyanoacetamide, malonanilide, p-nitrophenylacetonitrile, p-amino-benzoyl-acetanilide, furoylacetanilide, benzoylacetanilide, 1-(p-sulfophenyl)-3-methyl-5-pyrazolone.

Still other compounds include those having the structure of Formulae 1, 2 and 3 wherein RCO is an aliphatic acyl radical having 2 to 24 carbon atoms such as acetyl, propionyl, dodecoyl, hexadecoyl, etc., aromatic acyl, e. g. benzoyl, naphthoyl, chlorbenzoyl, etc., and heterocyclic acyl such as the acyl radicals from N-heterocyclic and S-heterocyclic carboxylic acids including nicotinic, iso-nicotinic, picolinic and thienyl carboxylic acids. Suitable hydrocarbon radicals for R' and R" are normal, primary, secondary, tertiary iso- and branched chain alkyl groups of 1 to 24 carbon atoms, e. g. methyl, ethyl, isopropyl, tertiary butyl, 2-ethylhexyl, n-octyl, n-dodecyl, n-hexadecyl, etc.; cycloalkyl, e. g. cyclohexyl, cyclopentyl, chlorocyclohexyl, dodecylcyclohexyl, etc.; aryl, e. g. phenyl, chlorphenyl, tolyl, xylyl, naphthyl, methylnaphthyl, chloronaphthyl, etc. and aralkyl, e. g. benzyl, chlorobenzyl, menaphthyl, etc.

In place of the specific aromatic amino developing agents described in the preceding examples may be substituted various other specific agents of this type. Suitable additional compounds are described in U. S. Patents 2,182,815, 2,189,817, 2,191,037, and 2,200,924.

Various types of organic colloids can be used as the binding agents for the dispersions or emulsions. Suitable colloids exhibiting high viscosity characteristics and appreciable jelly strength which can be used as binding agents include gelatin, albumin, agar-agar, Irish moss, and synthetic resins, e. g. polyvinyl alcohol, etc.

In place of the specific solvents mentioned in the above examples may be substituted many others which are relatively inert and do not enter into the reaction. Suitable additional solvents include chlorinated hydrocarbons, e. g. carbon tetrachloride, trichlorethylene, 1,2 - dichloroethane, chloroform, chlorobenzene, hydrocarbons, e. g. pentane, benzine, benzene, toluene, xylene, ethers, e. g., diethyl ether, etc. and others.

Certain of the novel dye intermediates are also useful in developer solutions, particularly those which contain solubilizing groups. However, it is often necessary or advisable to use wetting or dispersing agents to get them into solution. Suitable agents include higher alkyl sulfates and sulfonates, alkylated aromatic sulfonates, etc.

The condensation products of this invention are immobile or non-migratory in photographic emulsions and in addition they are photographically inert, that is, they do not adversely affect the photographic characteristics of the photographic emulsion. They lead to bright, haze-free images on color coupling development. The polymeric compounds may be easily prepared and are thus readily made available. The preferred products are readily soluble in dilute alkaline solutions and thus can be incorporated in colloid binding compositions such as gelatin emulsions without the necessity of resorting to special dispersion techniques.

When incorporated in photographic emulsion layers containing light sensitive silver salts and which may also contain sensitizing dyes, stabilizers, and fog inhibitors, it is found that the compounds do not adversely affect the sensitivity thereof. In addition the compounds are highly compatible with gelatin and do not lower the power of gelatin layers to adhere to the film base and to other colloid layers.

The silver salt images can also be developed with hydrazine developers in like manner to produce azo dye images. Suitable developers are described in U. S. Patent No. 2,220,929.

In addition, a silver halide emulsion layer containing one of the herein described disulfide dye intermediates which has been exposed and developed to a silver image and fixed can be treated with a diazo or tetrazo, etc. salt and converted into a colored image by the process of U. S. Patent 1,517,049.

The compounds hereof can also be used in photographic color processes involving azo coupling. They couple readily in emulsion layers with diazotized aromatic amines and give azo dye images of good color and strength. The new compounds give azo dyes which are of utility in the arts.

The dye intermediates of this invention have considerable utility in the arts and can be used in casting and molding compositions, viscose dopes, etc., where it is desired to produce color. They are of considerable utility in photographic color processes and the making of photographic prints.

It is rather surprising that the disulfide compounds are useful as dye coupling compounds in photographic processes, since the active methylene groups in many cases have been substituted leaving a single hydrogen atom attached to the original carbon atom.

As many apparently widely different embodiments of this invention may be made without departing from the spirit and scope thereof, it is to be understood that the invention is not to be limited by the embodiments herein except as defined by the appended claims.

I claim:

1. A photographic composition comprising a water-permeable organic colloid having uniformly distributed therethrough a symmetrical methinyl disulfide capable of forming a dye taken from the group consisting of quinoneimine and azomethine dyes on color coupling development having attached to each methinyl carbon atom a carbonyl group and an unsaturated activating group.

2. A photographic composition comprising a water-permeable organic colloid having uniformly distributed therethrough a disulfide reaction product of sulfur chloride with a dye intermediate containing at least one reactive methylene group, said reaction product being capable of forming a dye taken from the group consisting of quinoneimine and azomethine dyes on color coupling development.

3. A photographic composition comprising a water-permeable organic colloid having uniformly distributed therethrough a symmetrical acylacetamide disulfide capable of forming a dye taken from the group consisting of quinoneimine and azomethine dyes on color coupling development.

4. A photographic composition comprising a water-permeable organic colloid having uniformly distributed therethrough a bis pyrazolone disulfide capable of forming a dye taken from the group consisting of quinoneimine and azomethine dyes on color coupling development wherein the disulfide radical is attached to the methylene carbon atoms of the pyrazolone components.

5. A photographic element bearing at least one color yielding layer comprising a water-permeable organic colloid layer containing a light sensitive silver salt and a symmetrical methinyl disulfide capable of forming a dye taken from the group consisting of quinoneimine and azomethine dyes on color coupling development having attached to each methinyl carbon atom a carbonyl group and an unsaturated activating group.

6. A photographic element bearing at least one color yielding layer comprising a water-permeable organic colloid layer containing a light sensitive silver salt and a symmetrical acylacetamide disulfide capable of forming a dye taken from the group consisting of quinoneimine and azomethine dyes on color coupling development wherein the disulfide radical is attached to the methylene carbon atoms of the acylacetamide components.

7. A photographic element bearing at least one color yielding layer comprising a water-permeable organic colloid layer containing a light sensitive silver salt and a bis pyrazolone disulfide capable of forming a dye taken from the group consisting of quinoneimine and azomethine dyes on color coupling development wherein the disulfide radical is attached to the methylene carbon atoms of the pyrazolone components.

8. A photographic developer comprising an alkaline solution containing a color coupling developing agent and a symmetrical methinyl disulfide having attached to each methinyl carbon atom a carbonyl group and an unsaturated activating group.

9. The process which comprises developing a photographic element containing a reducible silver salt image record with a color coupling developer in the presence of a symmetrical methinyl disulfide having attached to each methinyl carbon atom a carbonyl group and an unsaturated activating group.

10. The process which comprises developing a photographic element containing a reducible silver salt image record with an arylene diamino developing agent in the presence of a symmetrical methinyl disulfide having attached to each methinyl carbon atom a carbonyl group and an unsaturated activating group.

11. The process of color photography which comprises developing a photographic element containing a reducible silver halide image record with an aromatic primary amino color coupling developing agent in the presence of dithio-bis-1-m-aminophenyl-3-methyl-5-pyrazolone.

12. A photographic element bearing at least one color yielding layer comprising a water-permeable colloid layer containing a light sensitive silver halide and dithio-bis-1-m-aminophenyl-3-methyl-5-pyrazolone.

13. The process of color photography which comprises developing a photographic element containing a reducible silver halide image record with an aromatic primary amino color coupling developing agent in the presence of dithio-bis-acetoacetanilide of the general formula:

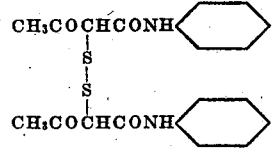

14. A photographic element bearing at least one color yielding layer comprising a water-permeable colloid layer containing a light sensitive silver halide and dithio-bis-acetoacetanilide of the general formula:

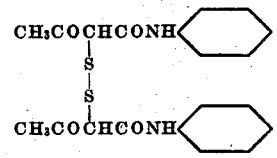

15. A photographic developer comprising an aqueous alkaline solution containing an aromatic primary amino color coupling developing agent and dithio-bis-1-phenyl-3-methyl-5-pyrazolone.

DAVID M. McQUEEN.